Jan. 7, 1936.                    J. W. BRYCE                    2,027,019
                                   SCALE
                            Filed Aug. 7, 1931              3 Sheets-Sheet 1
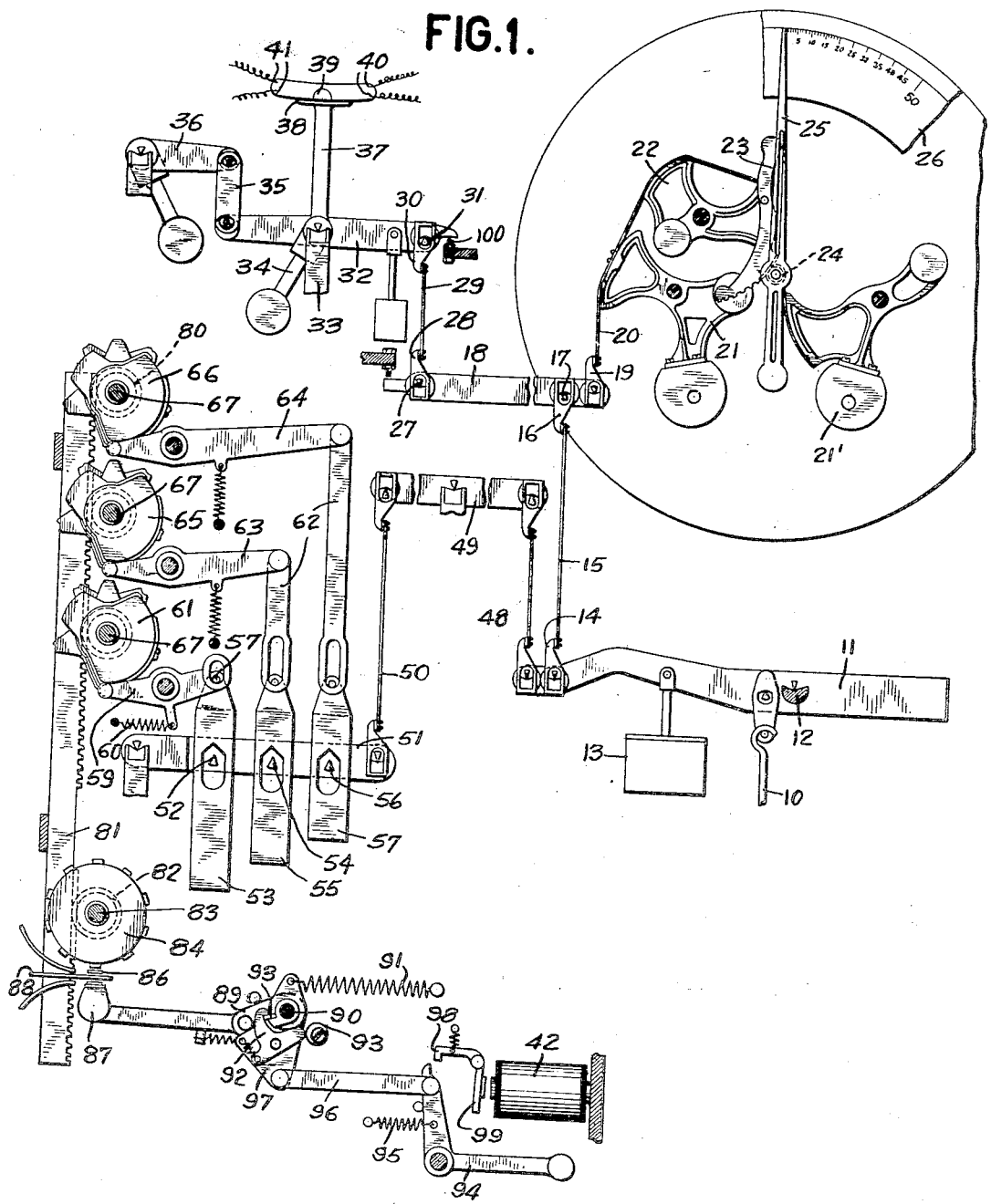
INVENTOR
J. W. Bryce
BY his ATTORNEY Jan. 7, 1936.          J. W. BRYCE                2,027,019
                          SCALE
                  Filed Aug. 7, 1931            3 Sheets-Sheet 2
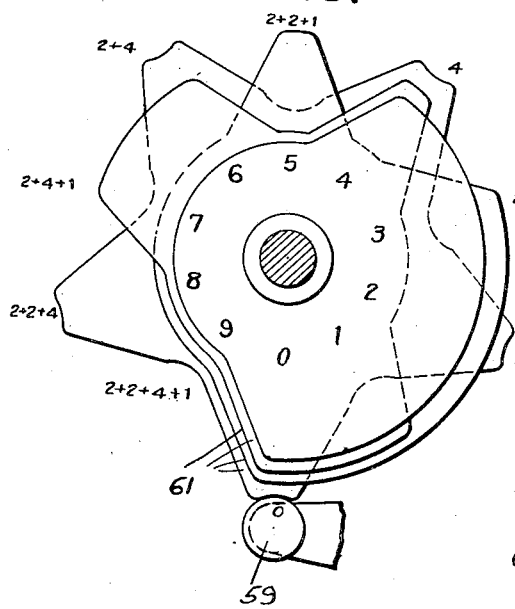
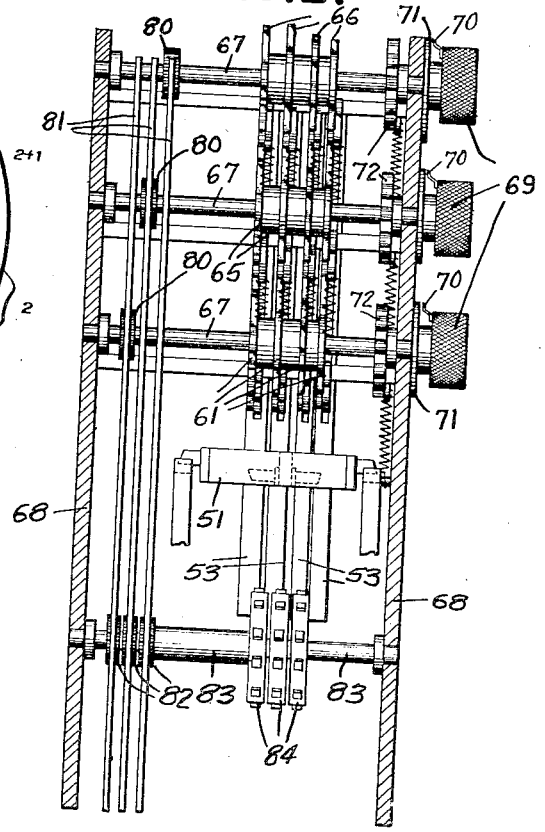
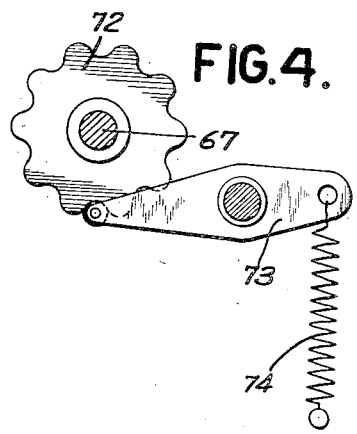
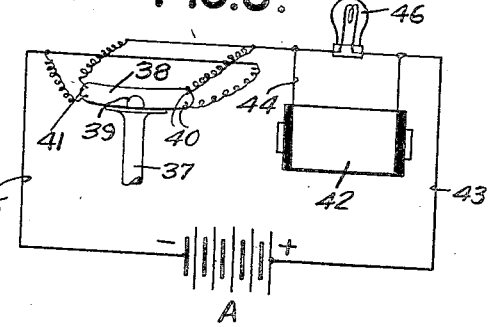
INVENTOR
J. W. Bryce
BY his ATTORNEY
W. M. Wilson Jan. 7, 1936.  J. W. BRYCE  2,027,019
SCALE
Filed Aug. 7, 1931  3 Sheets-Sheet 3

INVENTOR
J. W. Bryce
BY his ATTORNEY
W. M. Wilson

Patented Jan. 7, 1936

2,027,019

UNITED STATES PATENT OFFICE 2,027,019

SCALE

James Wares Bryce, Bloomfield, N. J., assignor, by mesne assignments, to International Business Machines Corporation, New York, N. Y., a corporation of New York Application August 7, 1931, Serial No. 555,715

21 Claims. (Cl. 265—5)

This case relates to equilibrium machines or weighing scales and particularly to an attachment for these machines adapted to provide a printed or punched record of the force acting on said machines.

In general, the object of the invention is to provide novel means for providing a printed or punched or printed and punched record of a load on the scale platform.

Further, an object is to provide an attachment which may be applied as a unit to practically any scale without changing the mechanism of the scale to furnish a record of the load on the scale.

Further still, an object of the invention is to provide means for offsetting a load on the scale and permitting a record to be made of the offsetting force only when the offsetting operation is correct within predetermined limits.

Another object of the invention is to provide a load offsetting means for an automatically counterbalanced scale which is adapted to return the automatic counterbalancing means to an initial position and to provide a control for manifesting that the automatic counterbalancing mechanism has returned to its initial position.

Still another object of the invention is to provide such an offsetting means which during the offsetting operation will position the recording means adapted to record the load.

Still another object is to provide an attachment for a scale which includes an auxiliary scale of small capacity relative to the capacity of the main scale which serves as a control for a recording means included in said attachment.

Another object is further to provide manual offsetting means in combination with an automatically counterbalanced scale and an interlock for manifesting that the manual offsetting operation has been properly effected.

Still further, the object is to provide a small capacity scale in combination with a large capacity scale for releasing a recording means to operate when the automatically counterbalanced means is in a predetermined position.

According to the invention the weighing scale comprises a settable load offsetting or counteracting mechanism for offsetting a load applied to a load support, and a supplementary controlling scale with connections to the load support related and arranged to cause the supplemental scale to detect differences between the applied load on the load support and the load offset or counteracted by the settable mechanism.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is a view of the attachment in combination with the upper part of the automatically counterbalanced scale.

Fig. 2 is a section through the printing or recording attachment.

Fig. 3 is a diagram showing the arrangement of the cams on each of the manually operated shafts which control the offsetting links.

Fig. 4 is a detail of the detent for holding the manually operated shaft in adjusted position.

Fig. 5 is a circuit diagram of the control for the printing mechanism; and

Figure 6:
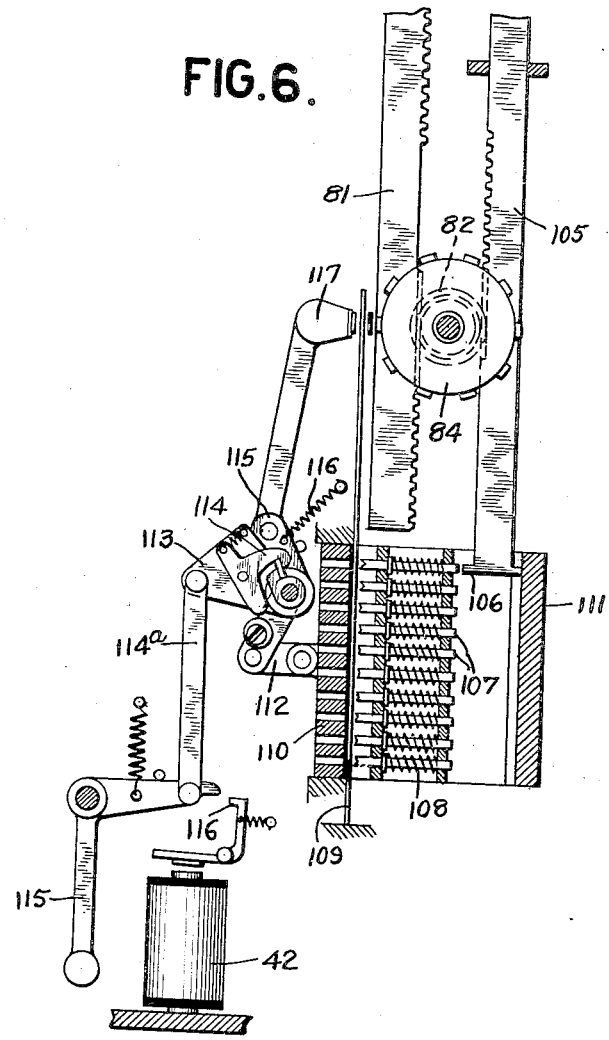
Fig. 6 is a view of a form of the invention in which the manual offsetting means is combined with both recording and punching attachments for printing and punching on the same record card.

Referring to the drawings in detail, Fig. 1 shows an automatically counterbalanced indicating scale of the type disclosed in Patent 1,777,873. This scale consists of a platform and base levers (not shown) connected to the draft rod 10 which acts on the intermediate lever 11 to rock it counterclockwise on its pivot 12. The usual dash pot 13 is connected to the intermediate lever to dampen the movement of the scale. One end of the lever 11 bears on a stirrup 14 attached to a tape 15 which is connected to a member 16 engaging the knife edge 17 on a lever 18. Adjacent the pivot 17, lever 18 bears on stirrup 19 attached to tape 20 which operates pendulums 21 and 21' and balanced member 22.

The balanced member 22 carries rack 23 engaging pinion 24 to operate indicator 25 which reads on dial 26 the load on the scale. Lever 18 at the left end (as viewed in Fig. 1) has a knife edge 27 cradled in a stirrup 28 fast to tape 29 which at the upper end connects by stirrup 30 to one end of a lever 32 supported on a standard 33. Lever 32 carries a pendulum 34 and by link 35 is connected to a pendulum 36.

When a load of only ¾ pound is on the scale, the portion of load transmitted through lever 18 to pendulums 34 and 36 is sufficient to hold lever 32 in engagement with an adjustable screw stop 100.

When lever 32 is in contact with stop 100, an arm 37 thereon is inclined. The arm 37 carries a curved tube 38 inside which is a globule of mercury. When arm 37 is inclined towards the right (Fig. 1) then globule 39 connects a pair of terminals 40. When arm 37 is inclined to the left (Fig. 1) globule 39 connects a pair of terminals 41 in series.

When terminals 40 or 41 are connected by globule 39, a circuit is completed through a control magnet 42 which with reference to Fig. 5 is as follows:

From the plus side of battery A, through line 43, magnet 42, line 44, terminals 40 or 41, and line 45 to the minus side of battery A.

In shunt with control magnet 42 is a signal lamp 46.

The load on the scale platform effects a downward pull or force on tape 15, and this force is factored between tapes 28 and 29 inversely in proportion to their moment arms about pivot 17 on lever 18. In the present case these moment arms are in the ratio 9:1, so that nine-tenths of the force is effective to pull downwardly on tape 28 to displace the main scale automatic counterbalancing mechanism, and one-tenth of it is transmitted through tape 29 to the small auxiliary scale comprising the lever 32. The main scale dial 26, of course, is properly graduated to indicate the correct load on the scale platform. As previously stated, ¾ pound on the scale platform is sufficient to move the right hand end of lever 32 against stop 100, thereby displacing the mercury globule 39 and causing it to engage contacts 40. After the lever has engaged stop 100, knife edge 27 of lever 18 becomes a stationary fulcrum for lever 18, which then acts as a simple intermediate lever between lever 11 and the counterbalancing pendulums 21 and 21'. The proper proportion of the applied load is thus always transmitted to the counterbalancing pendulums to properly indicate the load on the scale platform and this proportion is in no way affected by the presence of the small auxiliary scale.

The counteracting force for offsetting the platform load is supplied through the following mechanism: At its left end, (Fig. 1) lever 11 is connected by tape 48 to a lever 49 which through tape 50 pulls up on a lever 51. The lever 51 is adapted to support on knife edges 52 four unit weights 53, on knife edges 54 four tens weights 55, and on knife edges 56 four hundreds weights 57.

Unit weights 53 are each provided at the upper ends with pins 57 coacting with individual levers 59 normally urged by springs 60 to engage their free ends with corresponding unit cams 61. Tens weights 55 and hundreds weights 57 are similarly connected by pins to links 62 pivoted to levers 63 and 64 which at their free ends are held engaged with tens cams 65 and hundreds cams 66.

Each set of cams is fast to its shaft 67, the shafts being in the same vertical plane and journaled in a frame 68. Each shaft carries a knurled hand knob 69 outside one side of the frame, the knobs being provided with indexes 70 for coaction with the indications on a circular indicator plate 71. The shafts also carry inside the frame toothed wheels 72 engaged by individual latch levers 73 which are held engaged by springs 74. The latch levers and wheels 72 coact to retain shafts 67 and their cams in adjusted position.

The manner in which the cams of a shaft control the setting of weights on the lever 51 may be explained with reference to Fig. 3.

Each set of weights in a denomination contains two weights each of counterbalancing value "2" in its denomination, one of value "1" and one of value "4". When the high point of a cam is engaged with the lever of a weight, the latter is free of the beam 51. When the low point is engaged with the lever, the weight is deposited on beam 51. It will be understood that each set of cams and weights acts similarly but for purposes of the explanation assume that Fig. 3 shows the unit set of four cams 61. At zero position, all the high points of the cams are in coaction with the unit levers 59 and the unit weights are all free of lever 51. When the knob 69 on the unit shaft is turned until the index 70 shows "1" on the plate 71, then the high point of the cam 61 coacting with the lever engaging weight of value "1", moves off the lever, permitting the weight to drop on the knife edge of lever 51. When index 70 points to "2" on plate 71, then the peak of the cam coacting with unit weight "2" moves off the lever while the remaining three cams have their peaks engaged with their respective levers 59. At "3" position, weights 1 and 2 are deposited, at "4" position, weight 4 alone is deposited, and so on to provide by combinations of the weights, unit values of "1" to "9".

Each shaft 67 has a pinion 80 coacting with a rack 81 which at the lower end drives a pinion 82 on one of three nested shafts 83. Each shaft carries a printing wheel 84 provided with type 0 to 9. At the printing position is provided the usual ink ribbon 86 and hammer 87 adapted to be operated for causing the type in printing position to print on record 88. The hammer 87 is on a lever 89 freely rotatable about a shaft 90. A spring 91 normally tends to move the hammer to effect printing. This operation is prevented by means of a latch 92 engaging a tongue 93 on the lever 89. The latch 92 at one end bears on an eccentric stud 93. When a handle 94 is rocked clockwise against spring 95 it pulls link 96 to the right and rocks the plate 97 counterclockwise on its shaft 90.

Latch 92 which is pivoted to the plate 97 also moves with the plate to the right and in so doing is cammed by eccentric stud 93 counterclockwise relative to its carrying plate. This releases the latch from the tongue 93 permitting the spring 91 to propel the hammer 87 in a direction to effect a printing operation on the record sheet 88. The handle 94 can be moved clockwise only when not prevented by a latch 98. This latch is a part of an armature 99 coacting with magnet 42 previously described as energized by engagement of the mercury globule 39 with either terminals 40 or 41. The armature 99 will be rocked counterclockwise (as viewed in Fig. 1), when magnet 42 is energized, to locate the latch 98 in the path of handle 94. Thus, so long as the magnet 42 is energized, it is not possible to effect recording.

The machine operates as follows: Assume, for example, that the load on the platform is 149⅝ pounds. The load is transmitted through rod 10 to lever 11 which through tape 15 and lever 18 operates the pendulums 21 and 21' and an indicator 25 to indicate on dial 26 the weight of the load. The operator notes the indication on dial 26 and is thereby informed that a counteracting force of 149⅝ pounds is required. Assume that he first manipulates the hundreds knob 69 until its pointer 70 shows "1" on indicator 70. This deposits the hundreds weight 57 of value "1" on the lever 51 which through tape 50, lever 49 and tape 48, pulls up on the lever 11 in opposition to a pull down on the lever of 100 pounds on the platform. The effective force transmitted through tape 15 is now only 49⅝ pounds as is shown on dial 26 by indicator 25. The operator now turns the tens knob 69 to the "4" point on indicator 71, thus depositing on lever 51 tens weight 55 of value "4". This counteracts a force on the lever 11 of 40 pounds on the platform. The indicator 25 now reads 9⅝ on the dial 26. The operator now turns units knob 69 to the "9" point on indicator 70, thus depositing on lever 51, the four unit weights 53 of values "2", "2", "1" and "4". The indicator 25 now reads about ⅝ pound on dial 26.

As explained above, a load of ¾ pound on the platform is necessary to hold lever 32 inclined sufficiently to cause globule 39 to engage terminals 40 and energize magnet 42.

Since now only a load of ⅝ pound remains uncounterbalanced the lever 32 moves away from its inclined position and mercury ball 39 releases terminals 40 so that magnet 42 is now deenergized, handle 94 released and lamp 46 unlit. As soon as the operator notes that lamp 46 is no longer lit he operates handle 94 for effecting a printing operation. As the weights 53, 55 and 57 were set, the printing wheels 84 were correspondingly positioned to print 149. This figure will now be recorded on record sheet or card 88.

If the load were 149⅞ pounds instead of 149⅝ pounds then the operator should turn the knobs 69 to indicate 150 before effecting printing. The operator should be able to note whether the pointer 25 is above or below the ¾ pound point of a graduation of dial 26 and correspondingly manipulate knobs 69. If the pointer is at or above the ¾ pound point, then the counteracting force as applied by operation of knobs 69 should be the even pound graduation above the indicator. If the operator fails to do this, the ¾ pound load still not counteracted is effective on lever 32 to hold it inclined and terminals 40 connected for energizing magnet 42. The fact that the operator is then unable to move handle 94 informs him that the counteracting force should be increased by 1 pound.

If pointer 25 is below the ¼ pound point of a dial graduation and through error, the operator deposits counteracting weights corresponding to the even graduation mark above the indicator, then there will be a surplus force equivalent to ¾ pound on the platform pulling up on lever 11. This will cause lever 32 to incline to the left (Fig. 1), thereby placing globule 39 in engagement with contacts 41 to energize magnet 42 and light signal lamp 46. The operator is then unable to operate handle 94 which is now locked.

In Fig. 6 is shown a modification wherein punching means are provided to perforate the record card with an indication equivalent to the printed indication of the load. In this modification, racks 81 mesh with the gears on printing wheels 84, as explained above. In addition, however, the other sides of the pinions 82 drive racks 105 in correspondence with the movements of the printing wheels 84. Racks 105 at their lower ends are formed with lugs 106 moving over the heads of punch pins 107 normally urged by springs 108 towards the record sheet 109. A movable die 110 is guided by the frame 111 for movement towards the punch pins 107. The die 110 is operated by linkage 112 actuated by the triangular plate 113.

Triangular plate 113 is operated by link 114a and handle 115 when the handle is released by latch 116 controlled by a magnet 42 as in the first modification. Plate 113 releases its latch 114 from printing lever 115 permitting the spring 116 to rock the hammer 117 against the top of the record sheet for causing an imprint thereon of the load on the platform. As this is taking place linkage 112 is forcing die 110 towards the punch pins 107 also moving the record sheet 109 against the pins. The pins will be moved against their springs 108 by the surface of the sheet 109 except for those pins which are restrained from moving by the interposer lugs 106. These pins will punch the record card to indicate according to the Hollerith system of perforations the equivalent of the printed indication on the top of the record sheet. The Hollerith system is based on ten position in each card column, 0, 1, 2, . . . 9, the perforation in the 8 position for example indicating 8 and controlling the functions of a mechanical accounting machine in correspondence with the number 8.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

I claim:

1. In combination with a load carrier and means operated by a load thereon to move away from an initial position, a device for returning said means substantially to a predetermined position, a supplementary scale for detecting when said means reaches the predetermined position, auxiliary mechanism effective for an operation upon return of said means to the predetermined position and means controlled by said supplemental scale for preventing operation of said auxiliary mechanism until the predetermined position is reached.

2. In combination with a load carrier and automatic load offsetting mechanism operated by a load on the carrier to move said load offsetting mechanism away from an initial position, a settable device for returning the load offsetting mechanism to a predetermined position, auxiliary mechanism controlled by said device and effective for an operation upon return of the load offsetting mechanism to the predetermined position and means for preventing operation of the auxiliary mechanism until the predetermined position is reached.

3. In combination with weighing mechanism including means for automatically indicating the load acting on the mechanism, a settable device for returning the indicator to substantially initial position, and auxiliary mechanism including elements settable conjointly with said settable device and effective for an operation upon return of the indicator to substantially initial position and means for preventing operation of said auxiliary mechanism until said indicator reaches initial position.

4. In combination with weighing mechanism including means for automatically counterbalancing and indicating a load acting on the mechanism, a settable device for counteracting said load and returning the weighing mechanism to initial position, a supplemental scale for detecting the difference between the offsetting effects of the automatic mechanism and the settable device, and auxiliary mechanism controlled by said settable device and settable conjointly therewith and means for operating said auxiliary mechanism under control of said supplemental scale.

5. In combination, a main load responsive scale, a supplementary load responsive scale associated therewith, auxiliary mechanism, means for setting the auxiliary mechanism correspondingly to action of the main scale, and means controlled by the supplementary scale for effecting, independently of the main scale, an operation by said mechanism according to said setting.

6. In combination, a main scale, a supplementary scale associated therewith, auxiliary mechanism, means for setting the auxiliary mechanism correspondingly to action of the main scale, and means controlled by the supplementary scale for operating said mechanism according to said setting, a common load support connected to both scales for operating the latter, both scales being constantly responsive to the loads on the support during setting of the auxiliary mechanism.

7. In combination, a load responsive element, weighing mechanism influenced thereby, recording mechanism settable correspondingly to the load while the weighing mechanism is under the influence of the load acting on the load responsive element, means for causing the recording mechanism to make a record on a record sheet according to its setting, and means for preventing the recording operation unless at the time the setting of the recording mechanism corresponds to the load acting on the weighing mechanism, load offsetting means operable independently of said weighing mechanism for counteracting the load on the load responsive element, and control connections between the load offsetting means and the recording mechanism.

8. A weighing scale comprising a settable load offsetting mechanism for offsetting a load applied to a load support, and a supplemental controlling scale with connections to the load support related and arranged to cause the supplemental scale to detect differences between the applied load on the load support and the load offset by the settable mechanism, and in which the settable load offsetting mechanism positions a recording device for recording the loads weighed.

9. A weighing scale according to claim 8, in which the supplemental controlling scale prevents printing upon a detection of a difference between the applied load and the offset load.

10. In a weighing scale in combination, a load support and a main load offsetting mechanism with connections to the load support to effect displacement of the offsetting mechanism by a force directly proportional to a load on the load support, a settable load counterbalancing mechanism with connections to the load support to cause it to act in opposition to the main load offsetting mechanism to return the latter to initial position and an auxiliary counterbalancing mechanism connected to the load support to detect the difference between the load offsetting effects of the main load offsetting mechanism and the settable load counterbalancing mechanism.

11. In combination, an automatic load offsetting and indicating mechanism, a supplementary load offsetting mechanism and control means operated by the latter, a common load support for actuating the first named offsetting mechanism to indicate and offset a load on the load support and for actuating the supplementary load offsetting mechanism to operate the control means and auxiliary mechanism controlled by the control means.

12. In the combination specified in claim 11, a beam scale offsetting mechanism connected to the other offsetting mechanisms and the load support for neutralizing the effect of the load on the load support on the other mechanisms and including devices for positioning the auxiliary means during such neutralizing operation.

13. The combination specified in claim 11 in which said supplementary load offsetting mechanism is of the automatic counterbalance type.

14. The combination specified in claim 11 in which the auxiliary mechanism comprises recording means for recording the load on the load support.

15. In combination, a load support, an offsetting mechanism for offsetting the load on the support, recording mechanism settable in accordance with the load on the support, a supplementary automatic type offsetting means associated with said offsetting mechanism for sensing the equilibrium position of the latter, and controlling means for the recording mechanism operated by the supplementary offsetting means.

16. In combination, a load support, an offsetting mechanism for offsetting the load on the support, recording mechanism for making a record related to the load on the support, a supplementary automatic counterbalance for offsetting a fraction only of the load on the scale, and means for causing the recording mechanism to make a record under control of the supplementary counterbalancing means.

17. In combination, a load support, an offsetting mechanism for offsetting the load on the support, recording mechanism for making a record related to the load on the support, a supplementary offsetting means including a member movable in either direction from a neutral position to sense an under or over difference between the applied and offset loads, and electrical means controlled by the supplementary offsetting means upon sensing this difference for permitting the recording mechanism to make a record according to its setting.

18. In combination, a load support, an offsetting mechanism for offsetting load on the support, an auxiliary automatic type counterbalance for sensing a minimum under or over difference between the load on the support and the load offset by the offsetting mechanism, recording mechanism settable in relation to the load on the support, and means controlled by the auxiliary counterbalance upon sensing said difference for causing the recording mechanism to make a record in accordance with its setting.

19. In combination, automatic load weighing mechanism of a predetermined maximum capacity, automatically movable by the force of the load to variable positions corresponding to the load, means for making a record of the load to which said mechanism has responded comprising settable load offsetting means connected to said weighing mechanism to neutralize loads on the weighing mechanism less than the weighing capacity of the latter, recording devices, connections between the offsetting means and the recording devices for setting the latter in accordance with the load, and means for taking a record of the load from said devices when the load on the automatic weighing mechanism is completely neutralized by said offsetting means.

20. In combination, automatic load weighing mechanism having a predetermined load capacity automatically movable by the force of the load to variable positions corresponding to the load and including an indicator for indicating the load on the mechanism, and means for recording the load acting on the mechanism comprising recording devices, drop weights settable into coaction with said weighing mechanism to neutralize loads on the mechanism less than the automatic capacity of said mechanism, and common means for setting the drop weights and the recording devices to position the latter for making a record of the load neutralized by the drop weights.

21. In combination, automatic load weighing mechanism having a maximum load capacity automatically movable by the force of the load to variable positions corresponding to the load, a plurality of denominational orders of drop weights, means for setting the weights of each order into cooperation with said mechanism to neutralize a load acting on the mechanism equal to or less than the automatic capacity of the latter, multi-denominational order recording devices for recording the load, and connections between the different orders of the devices and the setting means for the corresponding orders of the drop weights to set the recording devices for making a record of the load when the latter has been completely neutralized by the drop weights.

JAMES WARES BRYCE.